C. L. HOFF.
MACHINE FOR ELECTRICALLY WELDING CHAIN LINKS.
APPLICATION FILED OCT. 4, 1909.
1,001,271.
Patented Aug. 22, 1911.
3 SHEETS—SHEET 1.
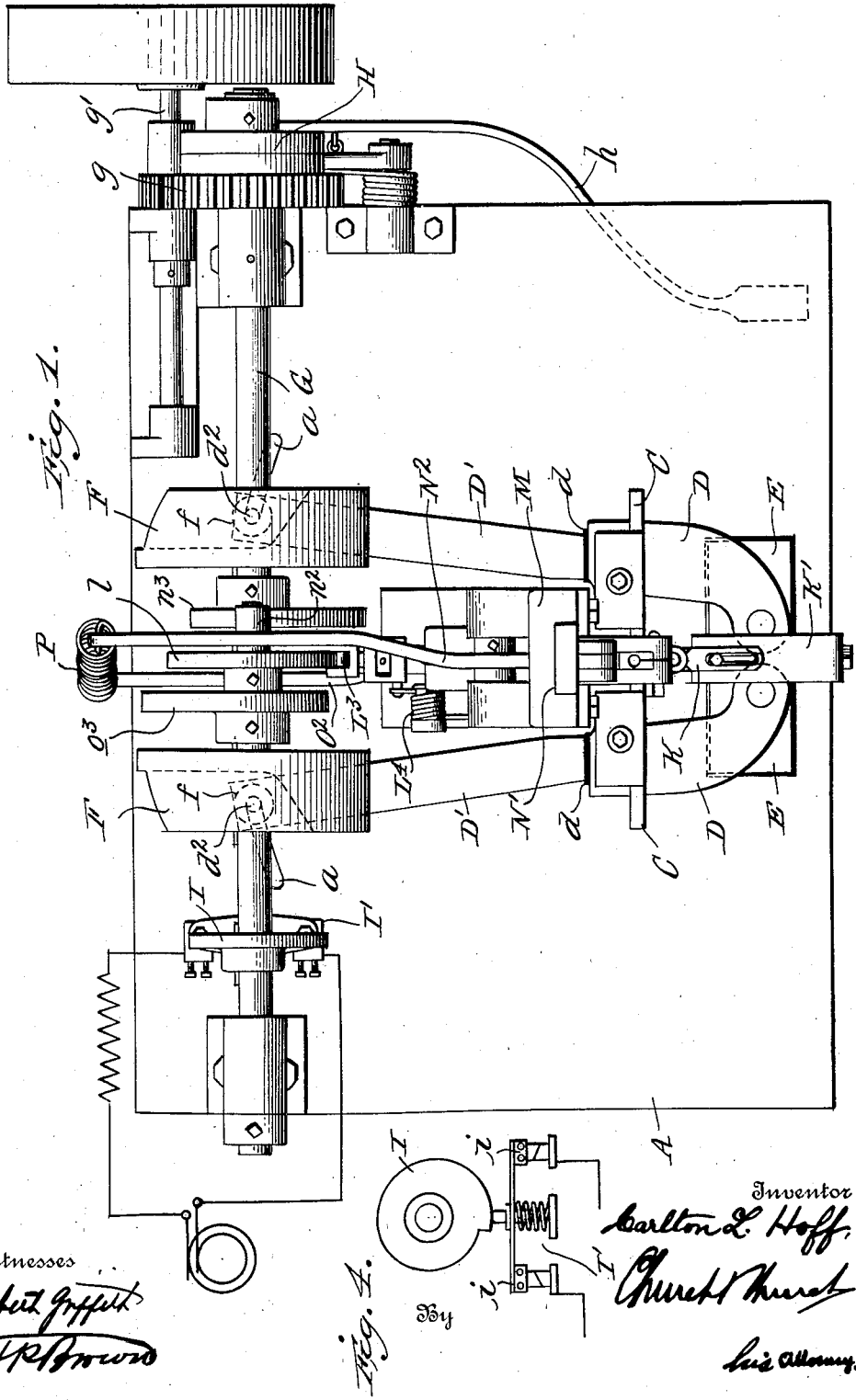

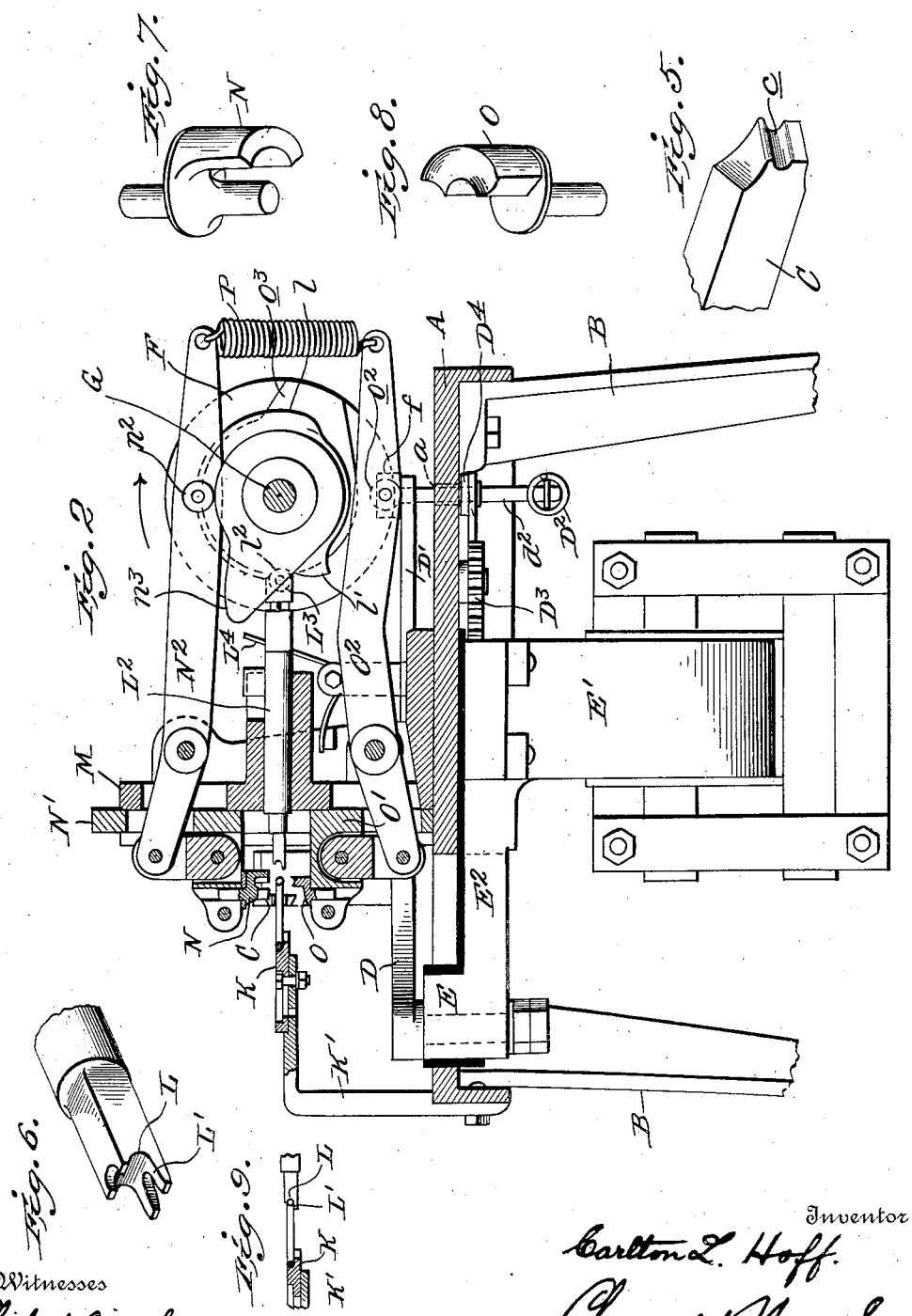

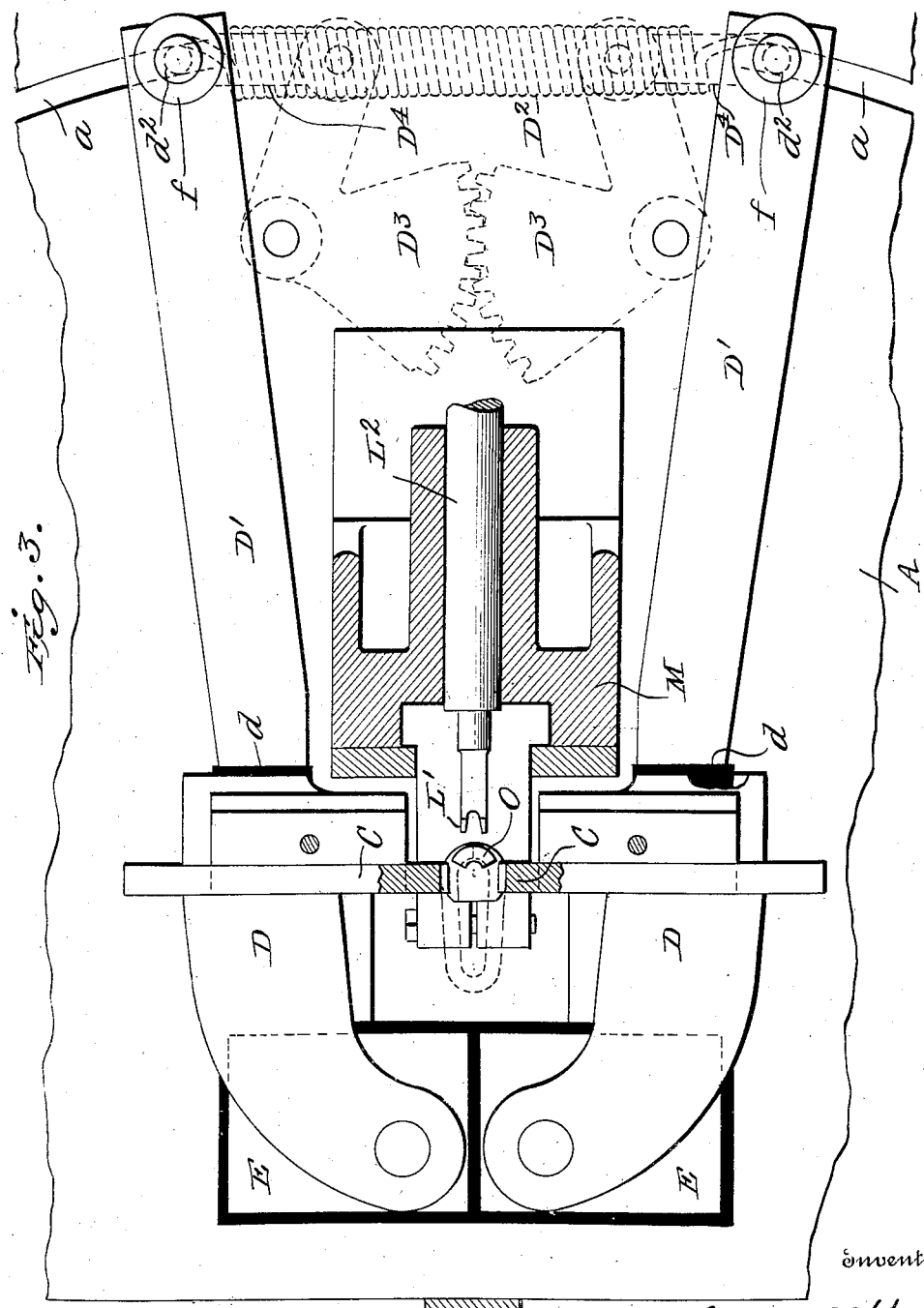

UNITED STATES PATENT OFFICE.

CARLTON L. HOFF, OF YORK, PENNSYLVANIA, ASSIGNOR TO STANDARD CHAIN COMPANY, OF YORK, PENNSYLVANIA, A CORPORATION OF PENNSYLVANIA.

MACHINE FOR ELECTRICALLY WELDING CHAIN-LINKS.

1,001,271.     Specification of Letters Patent.    Patented Aug. 22, 1911.

Application filed October 4, 1909. Serial No. 520,776.

*To all whom it may concern:*

Be it known that I, CARLTON L. HOFF, a citizen of the United States, residing at York, county of York, and State of Pennsylvania, have invented certain new and useful Improvements in Machines for Electrically Welding Chain-Links; and I do hereby declare the following to be a full, clear, and exact description of the same, reference being had to the accompanying drawings, forming a part of this specification, and to the figures and letters of reference marked thereon.

This invention relates to electric welding and more especially to that branch of the art having for its object the production of welded chain or chain links.

The machine of the present invention is only semi-automatic in its action, being designed primarily for welding individual links which are successively presented thereto by the attendant who operates the machine, although after being presented and the welding heat produced, subsequent manipulation to form the weld is automatically performed by the machine itself.

Referring to the accompanying drawings—Figure 1 is a top plan view of the machine with the parts in the position occupied by them when the welding current is being applied to a link. Fig. 2 is a section in a vertical plane substantially central of the machine with the parts in the position illustrated in Fig. 1. Fig. 3 is a detail sectional plan illustrating the welding electrodes and parts associated directly therewith and showing also the forward end of the positioning former. Fig. 4 is a detail sectional elevation of the switch for controlling the primary circuit of the welding transformer. Fig. 5 is a detail perspective view of one of the electrodes. Fig. 6 is a similar view of the forward end of the positioning former. Fig. 7 is a similar view of the top former. Fig. 8 is a similar view of the bottom former, and Fig. 9 is a detail sectional view corresponding to a part of Fig. 2, but with the positioning former advanced to partly form the weld.

Similar letters of reference in the several figures indicate like parts.

The working parts of the machine in the preferred construction, are preferably mounted upon a metal bed plate A which is conveniently supported by legs B at such height that the operator may work while seated in front of the machine. Said working parts of the machine embody welding or terminal electrodes C adjustably clamped in pivotal carriers D on each side of the center line of the machine, said carriers having their pivots close together and mounted in relatively large and long bearings E which constitute the fixed terminals of the secondary of the welding transformer E'. This welding transformer E' is clamped to the underside of the bed plate A, but is properly insulated therefrom and the terminals or bearings E are at the forward ends of arms $E^2$ the latter having a sufficient cross-sectional area to avoid resistance losses in the welding circuit.

For swinging the carriers D and electrodes C toward each other, the carriers are provided with rearwardly extending arms D' suitably insulated therefrom at $d$ and connected at their rear ends by a relatively heavy spring $D^2$, said spring being conveniently bridged between brackets or posts $d^2$ extending downwardly through slots $a$ in the bed plate A. In order that the electrodes will be forced to advance in unison intermeshing gear segments $D^3$ pivoted on the under face of the bed plate are connected by links $D^4$ with the rear ends of the arms D'.

For separating the carriers and electrodes the rear ends of the arm D' are provided with projections or rollers $f$ adapted to coöperate with oppositely disposed face cams F, on a counter-shaft G journaled in suitable bearings mounted transversely on the rear portion of the bed plate. The shaft G is adapted to be driven through gear wheels $g$ from a drive shaft $g'$ operated by a belt or other suitable power, there being interposed in the driving connections between said shafts $g'$ and G a one revolution clutch H controlled by a lever or treadle $h$. The proximate ends of the welding electrodes C are formed with grooves $c$, Fig. 5, for the reception of the sides of the link and as said electrodes advance or move toward each other they are adapted to press the open ends of the link together and supply current for raising said link ends to the welding heat. Inasmuch as the one revolution clutch arrests the movement of the shaft G when the electrodes are free to advance toward each other the welding current is applied until the operator again inaugurates the movement of the shaft G by depressing the treadle $h$. It is preferred that a switch be employed which opens the primary of the transformer during the initial forward movement of the shaft at each operation of the machine and a convenient form of switch is illustrated in Figs. 1 and 4. From these two figures it will be seen that a spiral cam I is mounted on the shaft and when the shaft is at rest the highest portion of the cam rests upon and depresses the movable contacts $i$ of a switch I' which is interposed in the primary circuit in the well understood manner.

In an arrangement such as so far described successive links might be presented to the electrodes when they are retracted or separated, which links will be closed and the welding current supplied for forming welds but, in accordance with the scheme of the present machine provision is made whereby not only may the links be quickly and accurately positioned by the attendant but during each operation of the machine after a link has been raised to the welding heat, suitable formers will be caused to operate upon the heated weld so as to give the link a correct and accurate form, as well as to insure a perfect union of the metal at that point.

To enable the attendant to quickly and accurately position succeeding links, an adjustable positioning gage K is mounted on a bracket K' immediately in front of the welding electrodes, the link engaging face of the gage being properly shaped to receive and position the closed end of the link. When the closed end of the link is placed in its seat on the gage K its forward end (open end) may rest upon or within the grooves in the electrodes C, although it is preferred to provide a positioning former which is movable into and out of position to engage with the inner or open ends of the links. This positioning former (shown in detail in Fig. 6) is provided with a forming groove L and a forwardly projecting supporting surface L' upon which the open ends of the link may rest and by which they will be supported in proper alinement for being grasped by the electrodes C when the latter advance toward each other.

The supporting former is retracted by a spring $L^4$ and constitutes a continuation of a cylindrical slide $L^2$ mounted in the machine head M. At its rear end the slide is provided with an adjustable anti-friction roller or surface $L^3$ adapted to travel on a cam carried by the shaft G and having a long cam projection $l$, a short but somewhat higher cam projection $l'$, and a recess or depression $l^2$ in which the anti-friction roller $L^3$ comes to rest after each movement of the shaft. During the time the link is being positioned by the attendant the anti-friction roller $L^3$ is traveling upon the long cam projection $l$, thus affording sufficient time for the attendant to position the link and for the electrodes to advance and grasp the same before the supporting or positioning former retreats from the position indicated in Fig. 9 to that indicated in Fig. 2.

For giving complete form to the weld, oppositely movable top and bottom formers N and O, Figs. 7 and 8, are provided said formers being mounted in vertically movable carriages N' and O' mounted to slide in ways in the head M and operated by levers $N^2$ and $O^2$, respectively, connected at their outer ends by a coil spring P and at an intermediate point provided with rollers or projections $n^2$, $o^2$ adapted to coöperate with edge cams $n^3$, $o^3$, respectively. The cams are all mounted on the counter-shaft G and are so formed and positioned with relation to each other that the following operations will be performed and in the order named at each revolution of the shaft G.

Assuming that the machine has come to rest with a link grasped between the electrodes and the welding current flowing, the attendant observing when the heat has reached the required degree depresses the treadle so as to inaugurate the movement of the shaft G. The movement of the shaft G first breaks the primary circuit of the welding transformer and practically at the same time advances the positioning former L transversely toward the axis of the link aperture into engagement with the end of the link at the welding point, thereby pushing back the metal which tends to work beyond the end of the link and giving a partial form to the weld. This movement of the positioning former is a quick movement of short duration for the cam projection $l'$ passes away from the rear end of the former slide when the shaft has made a very short angular advance. The cams $n^3$, $o^3$ next cause the bottom and top formers to advance, the bottom former being advanced slightly before the top former by the cam $o^3$ and being held by the concentric surface or dwell of the cam while the top former is advanced so as to shear off any surplus metal at the weld and give proper form to the same. During all these movements the welding electrodes have been held advanced by their spring $D^2$ but immediately upon the completion of the excursions of the top and bottom formers the cams F engage with the rollers $f$ on the arms D' of the electrode carriers and separate said electrodes, thereby allowing the link to drop by gravity or, if the attendant has previously hooked another open link therethrough the link discharged from the machine will be suspended upon the next link to be welded. The shaft G continues its movement and the attendant places the next link in position to be grasped by the electrodes, the positioning former L having in the meantime advanced into proper position for assisting in the location of the link due to the engagement of the long cam projection $l$ with the rear end of the former slide. At the instant when the positioning former retreats, owing to its rear end passing into the recess $l^2$ the shaft G is brought to rest by the automatic action of the one revolution clutch and the parts are in position for supplying current to raise the new link to a welding heat.

It will be noted from Fig. 3 that the welding electrodes grasp the link in proximity to its open end, but at the same time sufficiently far removed from the sharp curvature of such end to avoid any movement of the link with respect to the electrodes themselves as the link is being closed and welded. This feature is important inasmuch as practice has demonstrated the desirability of avoiding as far as possible any change in the form of the faces of the electrodes such as would be occasioned by the arcing and cutting action between the links and electrodes when relative movement occurs at their point of contact.

The electrode carriers being pivotally mounted close together and at points well forward of the link will cause the electrodes themselves at the points of contact with the link to move in arcs of circles which substantially correspond to the arcs of movement of the ends of the link and this arrangement also aids in avoiding any relative movement between the links and the electrodes with the result that a uniform and perfect contact will be made and maintained between the electrodes and the opposite sides of the link during the link closing and welding operation.

By making the positioning gage K adjustable on its bracket K', links of various lengths may be welded on the same machine without other change in adjustment and it is obvious that, by the simple substitution of other dies or formers links of heavy or light metal may be readily welded, inasmuch as the operating parts of the machine are all adapted for use without change in welding either heavy or light links.

The machine is designed primarily for welding links which are open at one end and in this respect, as well as with respect to certain broad features of construction, it corresponds to the machine of my prior application, Serial No. 405,245, filed December 5, 1907.

Having thus described my invention, what I claim as new and desire to secure by Letters Patent of the United States, is:—

1. In an electric chain welder, the combination with the welding electrodes movable toward and from each other, of a positioning former adapted to engage the outer side of the link at the welding point and movable transversely toward the axis of the link aperture, means for moving said former out of engagement with the link during the heating of the latter, and means for moving said former into engagement with the link at the welding point after the heating and for pressing the heated metal inwardly toward the axis of the aperture through the link, before the link is released.

2. In an electric chain welding apparatus, the combination with the welding electrodes movable toward and from each other, of a positioning former movable in alinement with the link horizontally into position for guiding a link to be grasped by the electrodes, means for withdrawing said positioning former during the heating of the link, and means for again moving said former into engagement with the link at the welding point before the latter is released by the electrodes to press the weld inwardly.

3. In an electric chain welding apparatus, the combination with the welding electrodes movable toward and from each other, to grasp a link and apply the heating current, of a fixed guide and movable positioning former located on opposite sides of the welding electrodes, and means for moving the movable positioning former out of engagement with the link during the heating of the latter.

4. In an electric chain welding apparatus, the combination with the welding electrodes movable toward and from each other to grasp the link and apply the heating current, of a fixed guide in front of said welding electrodes and a movable positioning former in rear of said electrodes between which guide and former the link is positioned, and means for withdrawing the movable former during the heating of the link.

5. In an electric chain welding apparatus, the combination with the welding electrodes movable toward and from each other to grasp the link and apply the heating current, of a positioning guide adjustably mounted in front of said electrodes, a positioning former movably mounted in rear of said electrodes, means for moving the positioning former out of engagement with the link during the heating of the latter, and means for forming the welded joint.

6. In an electric chain welding apparatus, the combination of the electrodes movable toward and from each other to grasp a link and apply the welding current, electrode carriers pivotally mounted on parallel axes in proximity to each other and a link supporting guide and a positioning former located on opposite sides of the electrodes, the guide being located a greater distance from the electrodes than the former on the opposite side of said electrodes, whereby the open end of the link to be welded is located remote from the axes of the carrier and the arcs of movement of the contact faces of the electrodes and link substantially coincide.

7. In an electric chain welding machine, the combination with the welding electrodes movable toward and from each other to grasp the link and apply the heating current, of a former movable in alinement with the link being welded to press the weld inwardly, transversely movable formers for giving form to the body of the weld, and means for advancing and retracting the first mentioned former prior to the operation of the transversely movable formers.

8. In an electric chain welding apparatus, the combination with the welding electrodes movable toward and from each other to grasp the link and apply the heating current, of top and bottom formers movable toward and from each other, a horizontally movable former, and means for moving the horizontally movable former between the top and bottom formers while the latter are retracted.

9. In an electric chain welding apparatus, the combination with the welding electrodes movable toward and from each other to grasp the link and apply the heating current, of three formers movable toward and from the welding point, and means for advancing said formers successively.

10. In an electric chain welding apparatus, the combination with the welding electrodes movable toward and from each other to grasp the link and apply the heating current, of three formers movable toward and from the welding point, one of said formers having a projecting portion forming a support for positioning the link prior to being welded, and means for advancing said formers successively after the link has been raised to a welding heat.

CARLTON L. HOFF.

Witnesses:
ANDREW J. BRENNEMAN,
GRACE M. DRAYER.